US007708811B2

(12) United States Patent
Ooya

(10) Patent No.: US 7,708,811 B2
(45) Date of Patent: May 4, 2010

(54) DEGASSING APPARATUS

(75) Inventor: Hajime Ooya, Osaka (JP)

(73) Assignee: Nitto Denko Corporation, Osaka (JP)

( * ) Notice: Subject to any disclaimer, the term of this patent is extended or adjusted under 35 U.S.C. 154(b) by 459 days.

(21) Appl. No.: 11/799,177

(22) Filed: May 1, 2007

(65) Prior Publication Data
US 2007/0256561 A1 Nov. 8, 2007

(30) Foreign Application Priority Data
May 1, 2006 (JP) ............................. 2006-127801

(51) Int. Cl.
*B01D 53/22* (2006.01)
(52) U.S. Cl. ........................... 96/6; 96/8; 96/10; 96/14; 96/193; 95/46; 95/50; 95/54; 95/266; 210/640; 210/321.8
(58) Field of Classification Search ...................... 96/4, 96/6, 8, 10, 14, 193; 95/45, 46, 50, 54, 266; 210/640, 321.8
See application file for complete search history.

(56) References Cited

U.S. PATENT DOCUMENTS

| 5,227,063 | A | * | 7/1993 | Langerak et al. ................. 96/6 |
| 5,279,647 | A | * | 1/1994 | Gatten et al. .................... 96/6 |
| 5,290,340 | A | * | 3/1994 | Gatten et al. .................... 95/46 |
| 5,340,384 | A | * | 8/1994 | Sims ................................ 96/6 |
| 5,772,736 | A | * | 6/1998 | van Schravendijk et al. ... 95/46 |
| 6,248,157 | B1 | * | 6/2001 | Sims et al. ........................ 96/6 |
| 7,291,204 | B2 | * | 11/2007 | Suzuki et al. .................... 96/8 |
| 7,427,312 | B2 | * | 9/2008 | Gerner et al. .................. 95/46 |
| 2001/0035093 | A1 | * | 11/2001 | Yokota ............................. 96/8 |

FOREIGN PATENT DOCUMENTS

| JP | 9-57009 | 3/1997 |
| JP | 9-187602 | 7/1997 |

* cited by examiner

*Primary Examiner*—Jason M Greene
(74) *Attorney, Agent, or Firm*—Hamre, Schumann, Mueller & Larson, P.C.

(57) ABSTRACT

A degassing apparatus is provided that accomplishes the connecting of a degassing element and a connecting member and/or the joining of a vacuum (reduced-pressure) chamber and the connecting member without using a fastening structure screwed together with the connecting member. A degassing apparatus includes: a reduced-pressure chamber having a through port for flowing a degassing target liquid therethrough; a degassing element, accommodated in the chamber, for passing the liquid therethrough; and a tubular connecting member joined to the chamber at the through port. The degassing element includes a gas-permeable tube, for passing the liquid therethrough, being covered with a joint piece at an end portion of the gas-permeable tube. The degassing element is fixed to the chamber by heat sealing the connecting member and the joint piece together.

25 Claims, 12 Drawing Sheets

DEGASSING APPARATUS

BACKGROUND OF THE INVENTION

1. Field of the Invention

The present invention relates to a degassing apparatus for removing a gas contained in a liquid.

2. Description of Related Art

The gases dissolved in a liquid can cause various problems, such as corrosion of the pipes through which the liquid flows, a decrease in the pressure or heat exchange rate because of the formation of bubbles, and unevenness in the coating of the liquid because of the bubbles formed. For this reason, degassing is necessary, depending on the purposes and uses of the liquid. For example, sufficient degassing is desired prior to the use of a liquid for cleaning wafers or the like in a semiconductor device manufacturing process.

Degassing a liquid (a degassing target liquid) may be carried out with the use of a degassing apparatus disclosed in JP 9-57009A (see FIG. 11). In the degassing apparatus 101 shown in FIG. 11, a degassing element 103 is placed in a vacuum chamber 102, and the ends of the degassing element 103 are fixed to the vacuum chamber 102 by connecting members 104. The degassing element 103 has a structure in which joint members 106 are fitted onto the ends of a tube bundle 105, in which two or more gas-permeable tubes are bundled together. Each of the connecting members 104 and the degassing element 103 are connected by inserting an end portion of the degassing element 103 together with the joint member 106 into the interior of the connecting member 104 and screwing a fastening means 108 onto the connecting member 104 in conjunction with a fastening ferrule 107. Each of the connecting members 104 and the vacuum chamber 102 are joined by inserting the connecting member 104 into an opening of the vacuum chamber 102 and screwing a fastening means 110 onto the connecting member 104 while disposing an O-ring 109 between the inner wall of the vacuum chamber 102 and the connecting member 104. The O-ring 109 also serves to enhance the hermetic sealing of the interior of the vacuum chamber 102.

A degassing apparatus disclosed in JP 9-187602A, for example, also may be used for degassing a liquid. This degassing apparatus has a structure similar to the above-described degassing apparatus 101, in which a degassing element is placed inside a vacuum chamber, but the way in which the degassing element is fixed to the vacuum chamber is different from the degassing apparatus 101. The method of fixing the degassing element in the degassing apparatus disclosed in JP 9-187602A is described with reference to FIG. 12. A degassing apparatus 121 shown in FIG. 12 has a structure in which an end portion of a degassing element 123 is fixed to a vacuum chamber 122 by a connecting member 124. The degassing element 123 has a structure in which a tube bundle 125 including at least two gas-permeable tubes bundled together is inserted in an outer tube 126 made of a fluoropolymer and the tube bundle 125 and the outer tube 126 are hermetically heat-sealed together. The connecting member 124 and the degassing element 123 are connected by inserting an end portion of the degassing element 123 into the interior of the tubular connecting member 124 so that the end portion is abutted to a pipe 127, which has a tapered end portion, and thereafter screwing a fastening element 130 onto the connecting member 124 so that the outer tube 126 is pressed against the inner peripheral surface of the connecting member 124. The connecting member 124 and the vacuum chamber 122 are joined by screwing the connecting member 124 into the vacuum chamber 122 so as to fit a male screw portion 128 formed on the outer peripheral surface of the connecting member 124 onto a female thread portion 129 formed on the inner peripheral surface of an opening of the vacuum chamber 122.

In the degassing apparatuses disclosed in JP 9-57009A and JP 9-187602A, the connecting of the degassing element and the connecting members or the joining of the vacuum chamber and the connecting members is accomplished by a fastening structure that is effected by screwing a fastening means that engages with a connecting member.

In order to accomplish this type of fastening structure, however, various members used for the connecting and joining, such as connecting members, fastening means, joining members, and fastening ferrules, are required to have high dimensional accuracy. Therefore, the just-mentioned fastening structure has been a cause of high manufacturing cost of the degassing apparatus.

In addition, the fastening structure effected by screwing a fastening means may suffer from a decrease in the screwing force (torque) over time. Consequently, the above-described connections and joining may become deficient over time, thereby lowering the hermetic sealing of the vacuum chamber or causing leakage of the liquid from the portions where the connecting members and the degassing element are connected. Although it is possible to retain the connections and joining more reliably by increasing the screwing force of the fastening means, an excessively large screwing force may result in breakage of the connecting members and the fastening means, which means that there is a limit to the amount that the screwing force can be increased.

Furthermore, depending on the purpose of use of the degassing apparatus, such as the use in a manufacturing process of semiconductor devices, the connecting members and fastening means may be made of a resin such as a fluoropolymer, in order to prevent the liquid from being contaminated by ion component. In such cases, the decrease in the screwing force over time is more apt to occur than when those members are made of a metal, and moreover, the increasing of the screwing force is more likely to result in breakage of the connecting members and fastening means.

SUMMARY OF THE INVENTION

Accordingly, it is an object of the present invention to provide a degassing apparatus in which the connection between the degassing element and a connecting member and/or the joining of the vacuum (reduced-pressure) chamber and the connecting member is/are accomplished without using a fastening structure effected by a fastening means screwed together with the connecting member, especially to provide the degassing apparatus in which a connecting member and/or the reduced-pressure chamber is/are made of a resin such as a fluoropolymer and a polyolefin resin.

A first degassing apparatus according to the present invention includes: a reduced-pressure chamber having a through port for flowing a degassing target liquid therethrough; a degassing element, accommodated in the reduced-pressure chamber, for passing the degassing target liquid therethrough; and a tubular connecting member joined to the reduced-pressure chamber at the through port. The degassing element includes a gas-permeable tube, for passing the degassing target liquid therethrough, being covered with a tubular joint piece at an end portion of the gas-permeable tube. The first degassing apparatus has a structure in which the degassing element is fixed to the reduced-pressure chamber by heat sealing the connecting member and the joint piece.

When focusing on the joining structure between the connecting member and the reduced-pressure chamber in one embodiment of the first degassing apparatus, the degassing apparatus according to the present invention also may be described as follows (a second degassing apparatus): The second degassing apparatus includes: a reduced-pressure chamber having a through port for flowing a degassing target liquid therethrough; a degassing element, accommodated in the reduced-pressure chamber, for passing the degassing target liquid therethrough; and a connecting member, joined to the reduced-pressure chamber at the through port, for fixing the degassing element to the reduced-pressure chamber. The connecting member that is in a condition of being inserted into the through port has, in at least a portion of its outer peripheral surface, a first tapered portion that decreases in diameter toward an interior of the reduced-pressure chamber. The through port has, in at least a portion of its inner peripheral surface, a second tapered portion that decreases in diameter toward the interior of the reduced-pressure chamber. In the second degassing apparatus, the connecting member is joined to the reduced-pressure chamber with the first tapered portion and the second tapered portion being in contact with each other.

When focusing on the joining structure between the connecting members and the reduced-pressure chamber in another embodiment of the first degassing apparatus, the degassing apparatus according to the present invention also may be described as follows (a third degassing apparatus): The third degassing apparatus includes: a reduced-pressure chamber having a through port for flowing a degassing target liquid therethrough; a degassing element, accommodated in the reduced-pressure chamber, for passing the degassing target liquid therethrough; and a connecting member, joined to the reduced-pressure chamber at the through port, for fastening the degassing element to the reduced-pressure chamber. In the third degassing apparatus, a ferrule is disposed between the connecting member and the through port, and the connecting member that is in a condition of being inserted in the through port together with the ferrule has, in at least a portion of its outer peripheral surface, a first tapered portion that decreases in diameter toward an interior of the reduced-pressure chamber. The through port has, in at least a portion of its inner peripheral surface, a second tapered portion that decreases in diameter toward the interior of the reduced-pressure chamber. The ferrule that is in a condition of being inserted in the through port has, in at least respective portions of its inner peripheral surface and its outer peripheral surface, third and fourth tapered portions that decrease in diameter toward an interior of the reduced-pressure chamber. In the third degassing apparatus, the connecting member is joined to the reduced-pressure chamber via the ferrule with the first tapered portion being in contact with the third tapered portion and the second tapered portion being in contact with the fourth tapered portion.

The first degassing apparatus can accomplish the connecting of the degassing element and the connecting member without using a fastening structure effected by a fastening means screwed together with a connecting member, unlike conventional degassing apparatuses. In addition, the first degassing apparatus can accomplish the joining of the reduced-pressure chamber and the connecting member without using the conventional fastening structure by choosing the structure.

The second and third degassing apparatuses can accomplish the joining of the reduced-pressure chamber and the connecting member without using a fastening structure effected by a fastening means screwed together with a connecting member, unlike conventional degassing apparatuses.

DETAILED DESCRIPTION OF THE INVENTION

Figure 1:
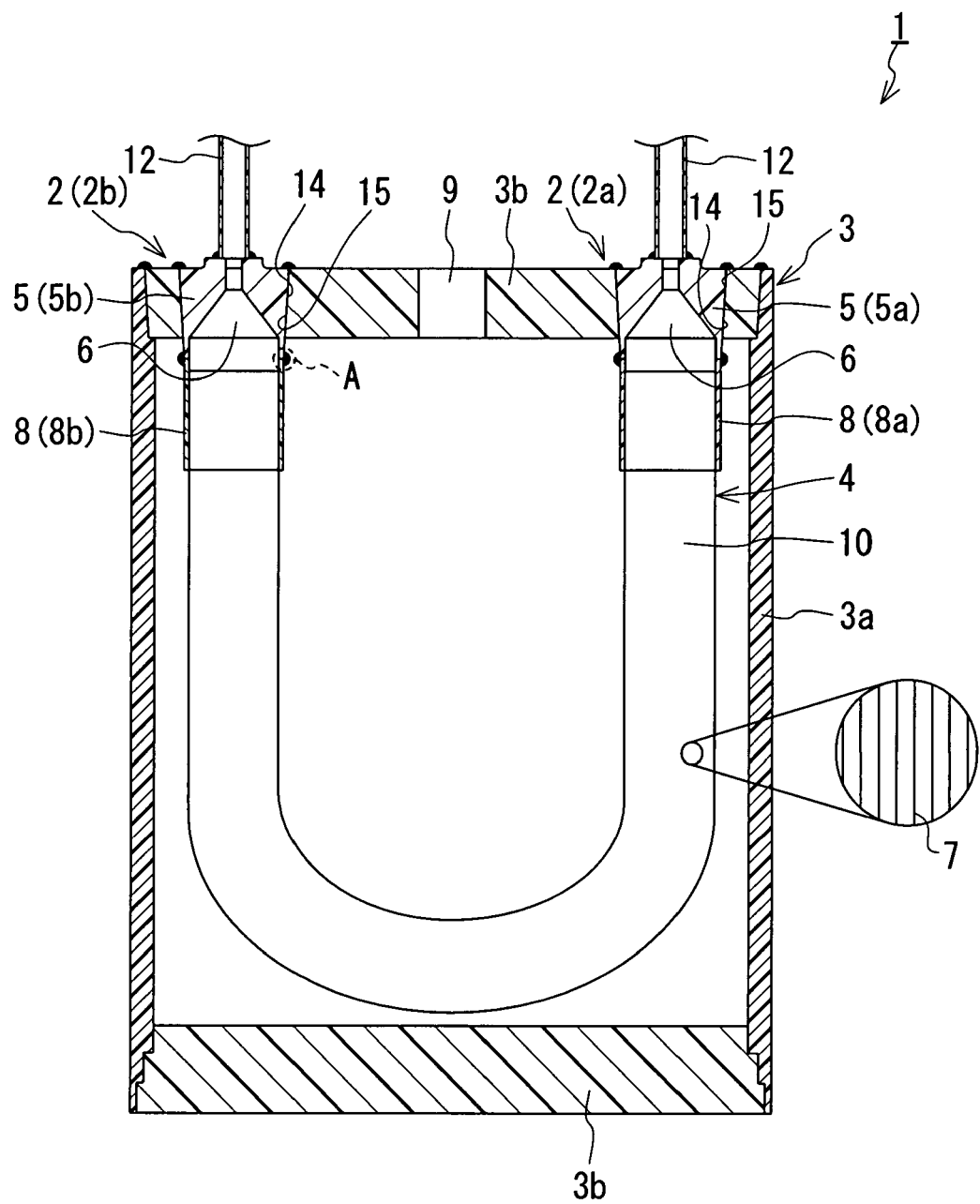
FIG. 1 is a cross-sectional view schematically illustrating one example of a degassing apparatus according to the present invention.

Hereinbelow, preferred embodiments of the present invention are described with reference to the drawings. In the following description, the same parts are designated by the same reference numerals and repetitive description thereof may be omitted.

FIG. 1 illustrates one example of a first degassing apparatus according to the present invention. The degassing apparatus 1 shown in FIG. 1 is furnished with a reduced-pressure chamber 3 having an inlet port 2a to which a degassing target liquid flows in and an outlet port 2b from which the liquid flows out, each port serving as a through port 2 for passing the liquid therethrough. A degassing element 4, through which the liquid passes, is accommodated in the chamber 3, and the degassing element 4 is fixed to the chamber 3 via tubular connecting members 5. The connecting members 5 are joined to the chamber 3 at the inlet port 2a and the outlet port 2b. The chamber 3 has a container 3a defined by a cylindrical body and a pair of lids 3b for sealing the openings of the end portions of the cylindrical body. The container 3a and the lids 3b are joined to each other so that the hermetic sealing of the interior of the chamber 3 can be ensured, and the through ports 2 (the inlet port 2a and the outlet port 2b) are formed in one of the lids 3b. Hereinafter, one of the lids 3b in which the through ports 2 are formed may be referred to as an upper lid 3b, while the other one of the lids 3b in which the through ports 2 are not formed may be referred to as a lower lid 3b.

In the degassing apparatus 1, the degassing element 4 includes gas-permeable tubes 7, through which the liquid passes, and tubular joint pieces 8 that cover the end portions of the gas-permeable tubes 7. The connecting members 5 and the joint pieces 8 are made of a thermoplastic resin. The degassing element 4 is connected to the connecting members 5 by heat sealing the connecting members 5 and the joint pieces 8, and is fixed to the chamber 3. It should be noted that in FIG. 1 and the figures hereinafter, the regions filled in with black (for example, the region "A" in FIG. 1) represent "burrs" that were produced when heat sealing the components that constitute the degassing apparatus 1. However, such burrs are not necessarily present in the actual degassing apparatus 1.

The degassing apparatus 1 can degas a degassing target liquid in the following manner. A pressure-reducing apparatus is connected to a connection port 9 formed in the upper lid 3b, and the interior of the chamber 3 is depressurized. Under this condition, the liquid is passed through the gas-permeable tubes 7, so that the liquid can be degassed.

In the degassing apparatus 1, the degassing element 4 and the connecting members 5 are connected by heat sealing. Therefore, it is unnecessary to use a fastening structure accomplished by a fastening means screwed together with a connecting member, as used in conventional degassing apparatuses. Such a connection structure effected by heat sealing does not necessarily require each of the members that constitute the connection structure to have high dimensional accuracy as is required by the above-mentioned connection structure effected by the fastening means, so it becomes possible to reduce the manufacturing cost of the degassing apparatus. Moreover, even when the connecting members are made of a resin, the creep over time as described previously does not occur. Therefore, the connection between the connecting members and the degassing element can be retained more reliably, and a highly reliable degassing apparatus can be obtained.

The degassing apparatus 1 shown in FIG. 1 includes a pair of connecting members 5. One of the connecting members 5 (a first connecting member 5a) is joined to the chamber 3 at the inlet port 2a, while the other one of the connecting member 5 (a second connecting member 5b) is joined to the chamber 3 at the outlet port 2b. One end portion of the degassing element 4 (the end portion to which the liquid flows in) is connected to the connecting member 5a by heat sealing a joint piece 8a, which is disposed on the just-mentioned end portion of the degassing element, and the connecting member 5a, while the other end portion of the degassing element 4 (the end portion from which the liquid flows out) is connected to the connecting member 5b by heat sealing a joint piece 8b, which is disposed on the just-mentioned end portion of the degassing element, and the connecting member 5b.

In the degassing apparatus according to the present invention, it is sufficient that at least one connection structure of the connecting member and the degassing element effected by heat sealing be provided; however, it is preferable that all the connection structures between the connecting members 5 and the degassing element 4 be accomplished by heat sealing the joint pieces 8 and the connecting members 5, as in the example illustrated in FIG. 1.

In other words, in the degassing apparatus according to the present invention, the connection structure effected by heat sealing with the connecting member may be provided for at least one end portion of the degassing element, i.e., one of the end portion to which the liquid flows in and the end portion from which the liquid flows out, but it is preferable that both of the end portions have the connection structure effected by heat sealing with the connecting members.

It is sufficient that the degassing element 4 has a joint piece 8 and at least one gas-permeable tube 7. And, as illustrated in FIG. 1, it is preferable that the degassing element 4 have at least two gas-permeable tubes 7 that are bound to each other at their respective end portions to form a tube bundle 10, and that joint pieces 8 cover the end portions of the tube bundle 10. In this case, the film area (degassing area) per unit capacity of the degassing element 4 can be made large. The number of the gas-permeable tubes 7 in the tube bundle 10 is normally in the range of from about several to several hundreds, although it varies depending on the use of the degassing apparatus 1.

The at least two gas-permeable tubes 7 may be bundled together according to known methods. For example, the respective end portions of the gas-permeable tubes 7 may be bonded to one another with a thermoplastic resin having heat-sealing capability, such as a fluoropolymer. Examples of usable fluoropolymers include, but are not particularly limited to, tetrafluoroethylene perfluoroalkyl vinyl ether copolymer (PFA), tetrafluoroethylene-hexafluoropropylene copolymer (FEP), and ethylene-tetrafluoroethylene copolymer (ETFE). In this case, the gas-permeable tube 7 or the tube bundle 10 may be bonded further to a joint piece 8 by the thermoplastic resin. This makes the support of the gas-permeable tube 7 (tube bundle 10) by the joint piece 8 more reliable.

Figure 2:
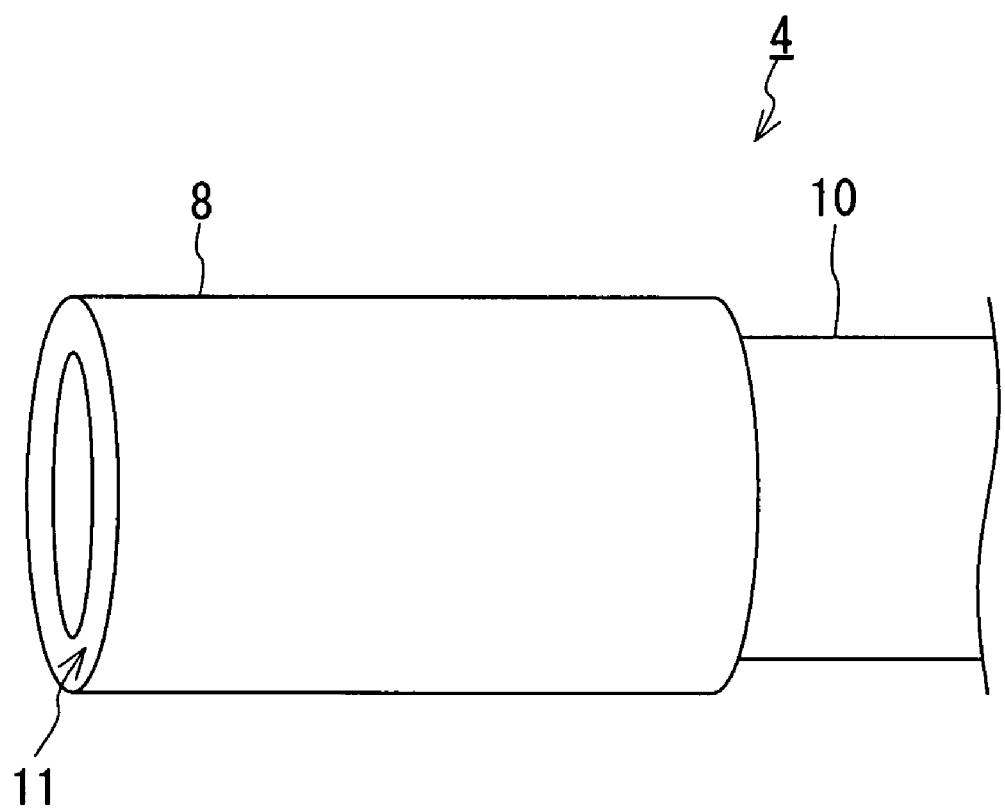
FIG. 2 is a perspective view illustrating one example of a degassing element of the degassing apparatus according to the present invention.

The structure and configuration of the joint piece 8 is not particularly limited as long as the joint piece 8 can cover an end portion of the gas-permeable tube 7 and can be heat sealed with the connecting member 5. The shape of the joint piece 8 is not limited. For example, the joint piece 8 may have a cylindrical tubular shape, as illustrated in FIGS. 1 and 2. It should be noted that FIG. 2 is an enlarged view of an end portion of the degassing element 4 shown in FIG. 1.

Although in the degassing apparatus 1 shown in FIG. 1 the joint pieces 8 are made of a thermoplastic resin, each of the joint pieces 8 may contain materials other than thermoplastic resin as long as each of the joint pieces 8 can cover the gas-permeable tube 7 and form the connection structure effected by heat sealing with the connecting member 5. For example, it is sufficient that the portion that forms the connection structure with the connecting member 5 be made of a thermoplastic resin, and for a more specific example, when a joint piece 8 is heat sealed at an end portion thereof (for example, an edge surface 11 shown in FIG. 2) with the connecting member 5, it is sufficient that only the edge surface 11 be made of a thermoplastic resin.

When made of a thermoplastic resin, the joint pieces 8 serve to reduce ion contamination of the degassing target liquid even in cases where, due to the design of the degassing apparatus, the joint pieces 8 and the liquid inevitably come into contact with each other.

The type of the resin that forms the joint pieces 8 is not particularly limited. For example, the joint pieces 8 may be made of a fluoropolymer. Fluoropolymers are chemically stable and can reduce further ion contamination of the degassing target liquid that passes through the degassing element 4 more effectively even in cases where the joint pieces 8 and the liquid come into contact with each other. Examples of usable fluoropolymers include polytetrafluoroethylene (PTFE), tetrafluoroethylene perfluoroalkyl vinyl ether copolymer (PFA), ethylene-tetrafluoroethylene copolymer, and polychlorotrifluoroethylene. It is preferable that the fluoropolymer be PFA because, due to its heat shrinkability, the covering of the gas-permeable tube 7 (tube bundle 10) is easy and the support to the gas-permeable tube 7 (tube bundle 10) becomes more reliable.

The portion of the joint piece 8 that is to be heat sealed with a connecting member 5 may only be, but is not particularly limited to, an end portion thereof (for example, the edge surface 11 shown in FIG. 2). In the example shown in FIG. 1, an end portion of each of the joint pieces 8 and an end portion of each of the connecting members 5 (an edge surface of the joint piece 8 and an edge surface of the connecting member 5) are heat-sealed together. Since such a connection structure can be formed by the heat sealing effected by abutting, which will be detailed in a later-described example, the degassing apparatus can be produced with high productivity.

The gas-permeable tube 7 may be a tube that is commonly used for degassing apparatuses. Specific examples include tubes made of fluoropolymers such as PTFE, PFA, ethylene-tetrafluoroethylene copolymer, and polychlorotrifluoroethylene, and tubes made of polyolefins such as polyethylene and polypropylene. Usually, the inner diameter of the gas-permeable tube 7 is within the range of from about several ten micrometers to about several millimeters.

The structure and configuration of the connecting member 5 is not particularly limited as long as it can be joined to the chamber 3 at a through port 2 and can permit the degassing element 4 to be fixed to the chamber 3.

Figure 3:
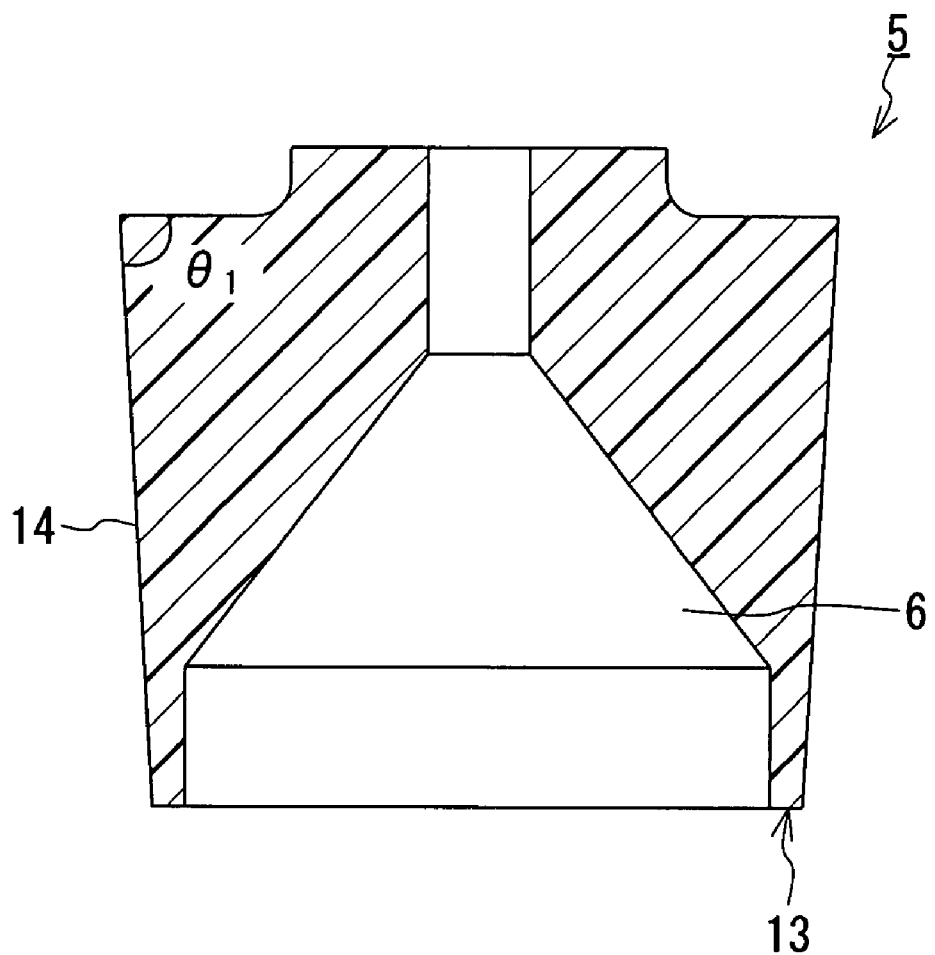
FIG. 3 is a partially cut-away view illustrating a portion of one example of a connecting member of the degassing apparatus according to the present invention.
Figure 4:
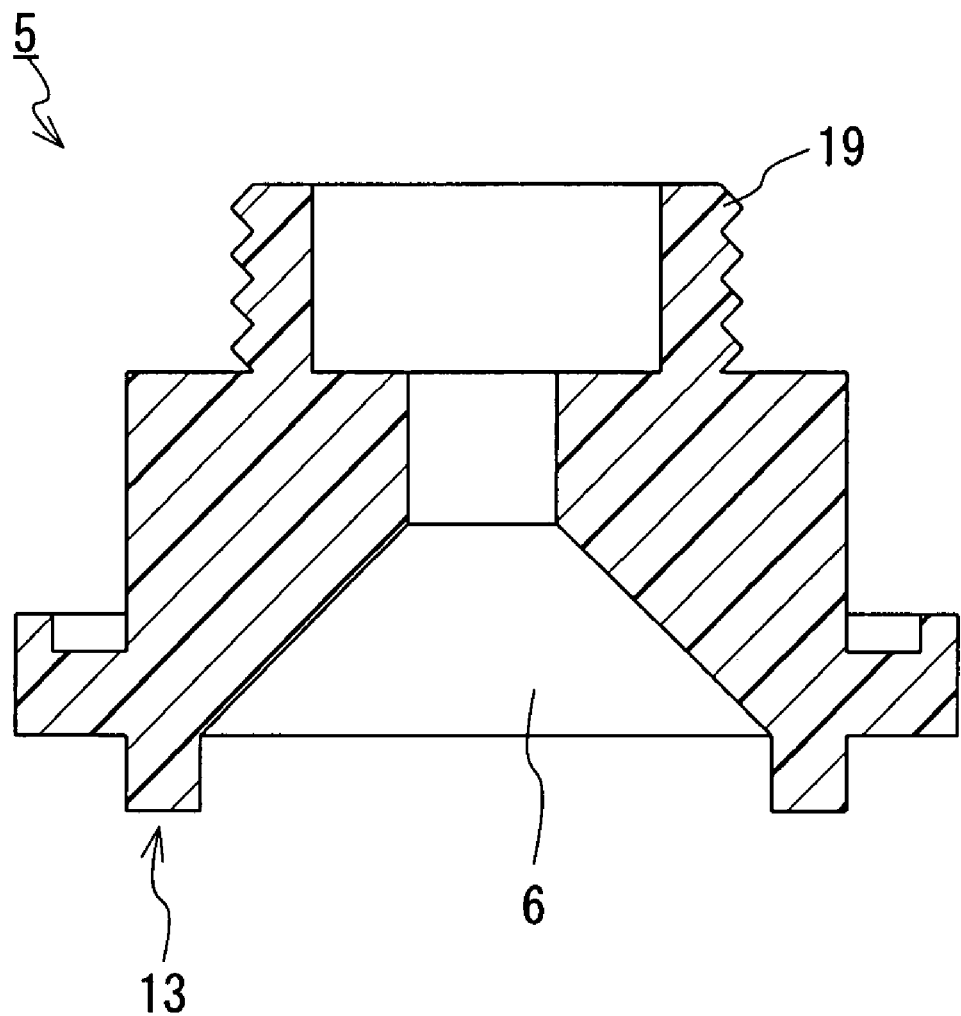
FIG. 4 is a cross-sectional view illustrating another example of the connecting member of the degassing apparatus according to the present invention.

The shape of the connecting member 5 is not particularly limited. For example, the connecting member 5 may have a shape as shown in FIGS. 1 and 3, or may have a shape as shown in FIG. 4. The connecting member 5 having the shape as illustrated in FIGS. 1 and 3 and the connecting member 5 having the shape as illustrated in FIG. 4 are different in the ways in which they are joined to the chamber 3, as will be discussed later. FIG. 3 only depicts the connecting member 5 of the degassing apparatus 1 shown in FIG. 1.

Although the connecting member 5 of the degassing apparatus 1 shown in FIG. 1 are made of a thermoplastic resin, the connecting member 5 may contain materials other than the thermoplastic resin as long as it can form a connection structure with the joint piece 8. For example, only the portion that forms the connection structure with the joint piece 8 may be made of a thermoplastic resin, and for a more specific example, in the case where the connecting member 5 is heat sealed at an end portion thereof (for example, an edge surface 13 shown in FIG. 3) with the joint piece 8, it is sufficient that only the edge surface 12 be made of a thermoplastic resin.

When the connecting member 5 is made of a thermoplastic resin, ion contamination of the degassing target liquid can be lessened even in cases where a flow path 6 for the liquid is formed in the connecting member 5, as shown in FIGS. 1, 3, and 4.

The type of the resin that constitutes connecting member 5 is not particularly limited, and may be the same type of the resin as that constitutes the joint piece 8. When the connecting member 5 is made of a fluoropolymer, ion contamination of the degassing target liquid can be lessened further even in cases where the flow path 6 for the liquid is formed therein. It is preferable that the fluoropolymer be PFA.

More specifically, it is preferable that at least either one of the resin that constitutes the connecting member 5 and the resin that constitutes the joint piece 8 be made of a fluoropolymer (preferably PFA), and it is more preferable that both of them be a fluoropolymer (preferably PFA).

The connecting member 5 and the joint piece 8 may be made of either the same or different thermoplastic resins, but in order to make the connection structure effected by heat sealing more reliable, it is preferable that both the connecting member 5 and the joint piece 8 be made of the same thermoplastic resin.

The portion of connecting member 5 that is to be heat sealed to a joint piece 8 is not particularly limited, and it may be an end portion thereof (one example being the edge surface 13 shown in FIGS. 3 and 4).

The structure and configuration of the reduced-pressure chamber 3 is not particularly limited, as long as the chamber 3 can accommodate the degassing element 4 in the interior thereof, has the through ports 2 through which the degassing target liquid flows and the connection port 9 to which a pressure-reducing apparatus is connected, and can withstand the pressure difference between the interior of the chamber and the external environment during depressurization. Although the chamber 3 illustrated in FIG. 1 includes a container 3a that is formed of a cylindrical body, and a pair of lids 3b that are for sealing the openings of the container 3a, the reduced-pressure chamber may be such that the container is formed of a closed-bottom cylindrical body and an opening thereof is sealed by one lid.

The method for joining the container 3a and the lid 3b together is not particularly limited, and may be the same as used for common degassing apparatuses. In the chamber 3 illustrated in FIG. 1, the lower lid 3b is fitted in and joined to the container 3a, and the upper lid 3b is likewise fitted in and joined to the container 3a. In particular, the upper lid 3b and the container 3a are joined together with the tapered portion formed on the outer peripheral surface of the upper lid 3b being in contact with the tapered portion formed on the inner peripheral surface of an opening of the container 3a. By making such a joining structure, the joining of the lids and the container can be retained more reliably. In the chamber 3 illustrated in FIG. 1, the upper lid 3b additionally is heat sealed to the container 3a, so that the joining between the upper lid and the container can be retained even more reliably.

The through port 2 and the connection port 9 may be formed in at least either one of the container 3a and the lid 3b. That said, it is more preferable that the ports be formed in the lid 3b, which has a plate-like shape, rather than in the container 3a, which has a cylindrical shape, so that the strength of the degassing apparatus 1 can be higher.

Although in the degassing apparatus 1 illustrated in FIG. 1, the reduced-pressure chamber 3 is made of a thermoplastic resin, it may contain materials other than the thermoplastic resin, including glass and metals such as stainless-steel, as long as the chamber 3 can be joined to the connecting member 5 at the through port 2. The container 3a and the lid 3b may be made of different materials. For example, the reduced-pressure chamber may include a container made of a metal and a lid made of a thermoplastic resin.

The type of the thermoplastic resin that constitutes the chamber 3 is not particularly limited, and for example, the foregoing fluoropolymers and polyolefins such as polypropylene may be used.

Figure 5:
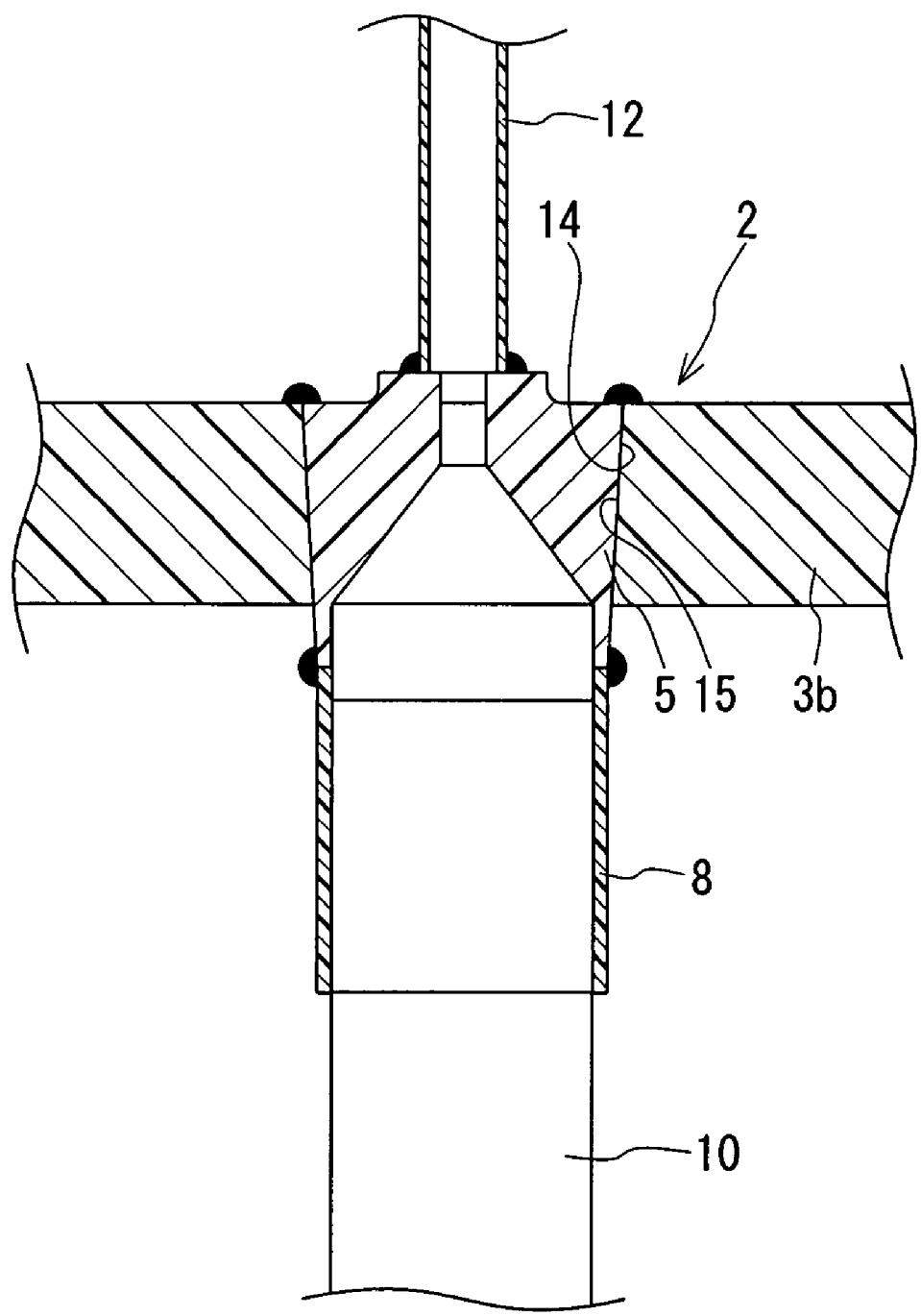
FIG. 5 is a cross-sectional view illustrating the connection structure of a connecting member and a degassing element of the degassing apparatus shown in FIG. 1.

In the first degassing apparatus, the joining method (joining structure) of the connecting members 5 and the reduced-pressure chamber 3 is not particularly limited. As illustrated in the enlarged view of FIG. 5, the degassing apparatus 1 shown in FIG. 1 has a joining structure as follows: A connecting member 5 has a first tapered portion 14 in its outer peripheral surface, when it is inserted in the through port 2. The first tapered portion 14 decreases in diameter toward the interior of the chamber 3. The through port 2 of the chamber 3 has, in its inner peripheral surface, a second tapered portion 15 that decreases in diameter toward the interior of the chamber 3.

The connecting member 5 is joined to the chamber 3 with the first tapered portion 14 being in contact with the second tapered portion 15.

With such a joining structure, the connecting member 5 is pressed toward the interior of the chamber 3 when the interior of the chamber 3 is depressurized, and at the same time, a force acts in the direction such that the first tapered portion 14 and the second tapered portion 15 are brought into more firm contact with each other. Consequently, the joining of the chamber 3 and the connecting member 5 can be accomplished without using a fastening structure effected by a fastening means screwed together with a connecting member, unlike conventional degassing apparatuses. Moreover, with such a joining structure, the creep over time such as described previously does not occur even when the connecting member is made of a resin. Therefore, it becomes possible to retain the joining between the connecting member and the reduced-pressure chamber more reliably.

The first tapered portion 14 only needs to be formed in at least a portion of the outer peripheral surface of the connecting member 5, and the second tapered portion 15 only needs to be formed in at least a portion of the inner peripheral surface of the through port 2. The shapes of the first tapered portion 14 and the second tapered portion 15 are not particularly limited as long as both of the tapered portions can be in contact with each other.

In the degassing apparatus 1 shown in FIG. 1, the connecting members 5 and the chamber 3 are heat-sealed together at the through ports 2. In this case, the joining between the connecting members 5 and the chamber 3 can be retained more reliably. In cases where the connecting member 5 and the chamber 3 contain materials other than thermoplastic resin, a thermoplastic resin portion of the connecting member 5 and a thermoplastic resin portion of the chamber 3, for example, may be heat-sealed together.

Figure 6:
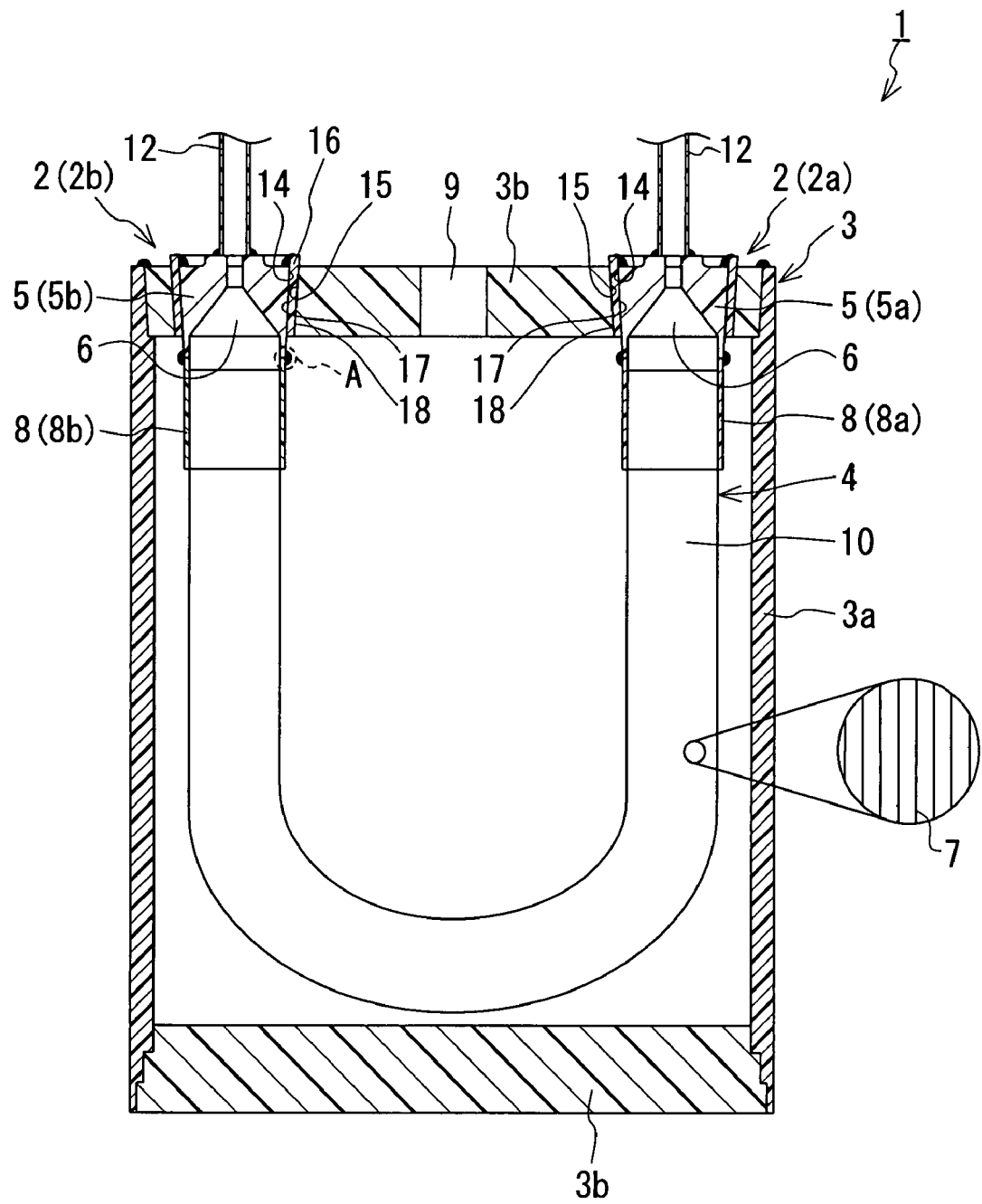
FIG. 6 is a cross-sectional view schematically illustrating another example of the degassing apparatus according to the present invention.

FIG. 6 illustrates another example of the first degassing apparatus according to the present invention. A degassing apparatus 1 shown in FIG. 6 has the same configuration as that of the degassing apparatus 1 shown in FIG. 1 except for the joining structure between the connecting members 5 and the reduced-pressure chamber 3.

Figure 7:
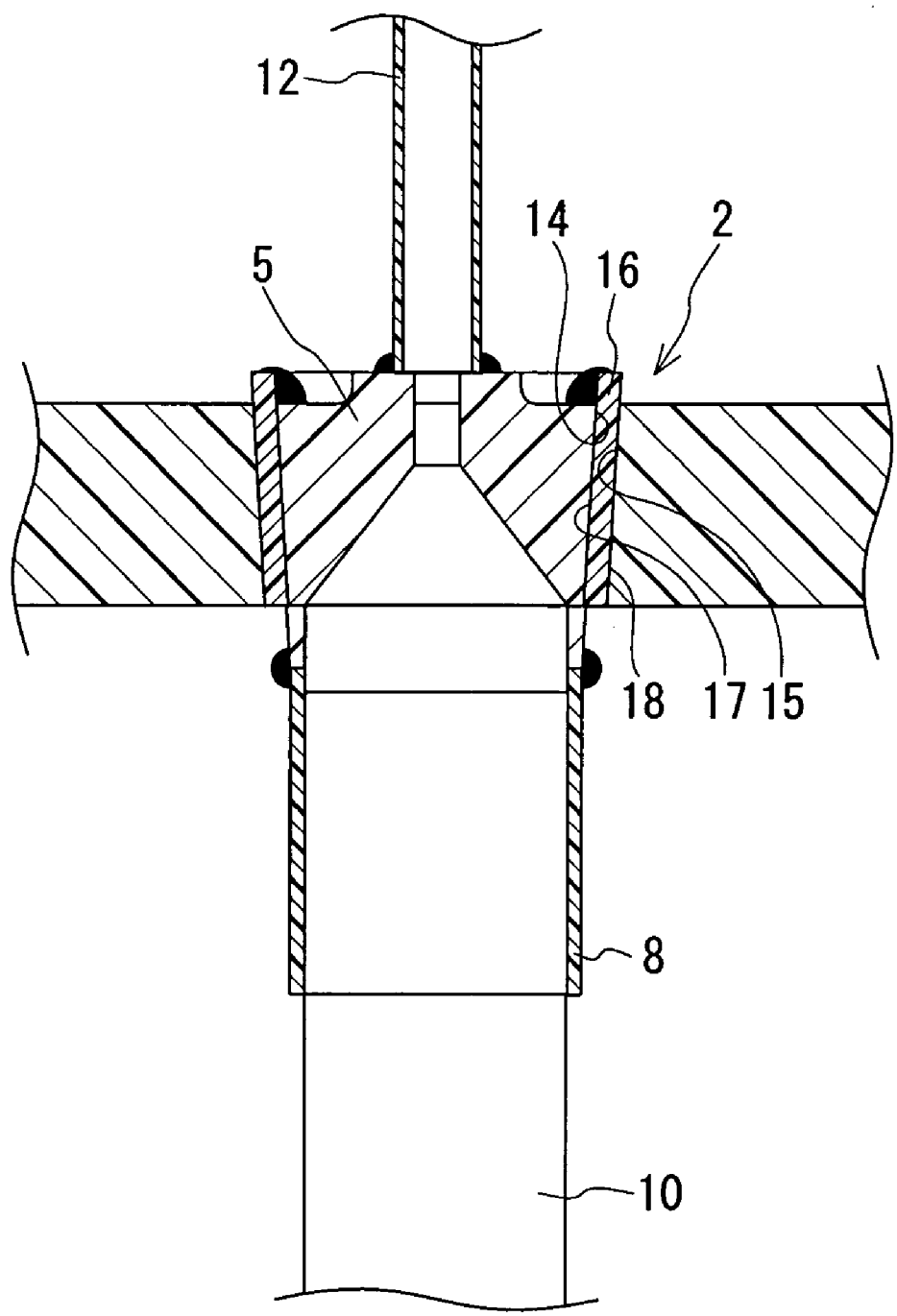
FIG. 7 is a cross-sectional view illustrating the connection structure of a connecting member and a degassing element of the degassing apparatus shown in FIG. 6.

In the degassing apparatus 1 shown in FIG. 6, a connecting member 5 is joined to the reduced-pressure chamber 3 via a ferrule 16 disposed between the connecting member 5 and the through port 2. More specifically, as illustrated in FIG. 7, which shows an enlarged view, the degassing apparatus 1 shown in FIG. 6 has a joining structure as follows: The connecting member 5 has a first tapered portion 14 in its outer peripheral surface, when it is in a condition of being inserted in the through port 2 together with the ferrule 16. The first tapered portion 14 decreases in diameter toward the interior of the chamber 3. The through port 2 has, in its inner peripheral surface, a second tapered portion 15 that decreases in diameter toward the interior of the chamber 3. The ferrule 16 has a third tapered portion 17 in its inner peripheral surface, and has a fourth tapered portion 18 in its outer peripheral surface, when the ferrule 16 is in a condition of being inserted in the through port 2. The third and fourth tapered portions decrease in diameter toward the interior of the chamber 3. The connecting member 5 is joined to the chamber 3 via the ferrule 16 with the first tapered portion 14 being in contact with the third tapered portion 17 and the second tapered portion 15 being in contact with the fourth tapered portion 18.

With such a joining structure, the connecting member 5 is pressed toward the interior of the chamber 3 when the interior of the chamber 3 is depressurized, and at the same time, a force acts in a direction such that the first tapered portion 14 and the second tapered portion 15 are brought into more firm contact with the third tapered portion 17 and the fourth tapered portion 18, respectively. At this time, the ferrule 16 deforms into a shape that follows the shape of the tapered portions. As a result, the hermetic sealing is improved further over the degassing apparatus 1 shown in FIG. 1, and the joining between the chamber 3 and the connecting member 5 can be retained more reliably.

Figure 8A:
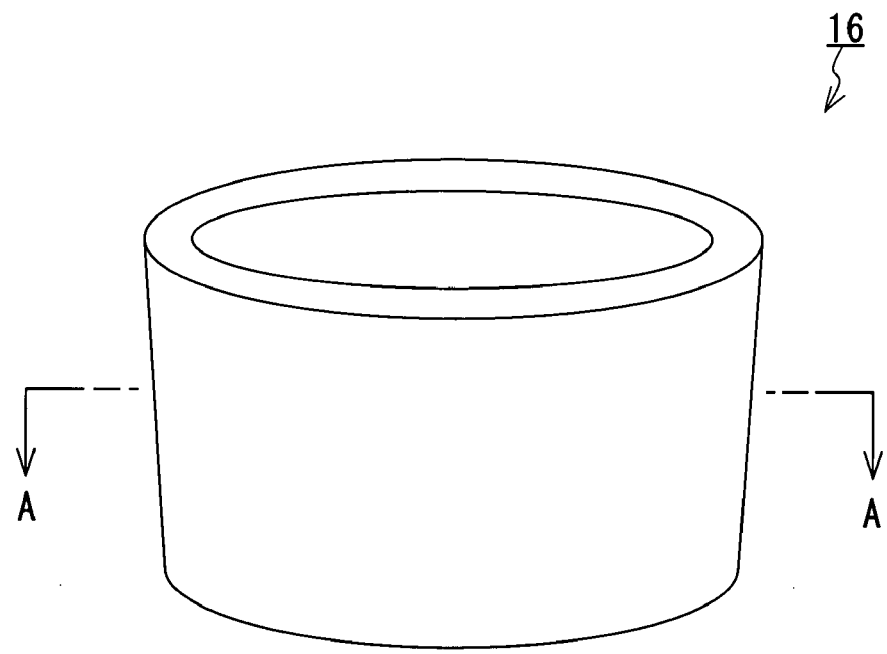
FIG. 8A is a perspective view illustrating one example of a ferrule of the degassing apparatus according to the present invention.
Figure 8B:
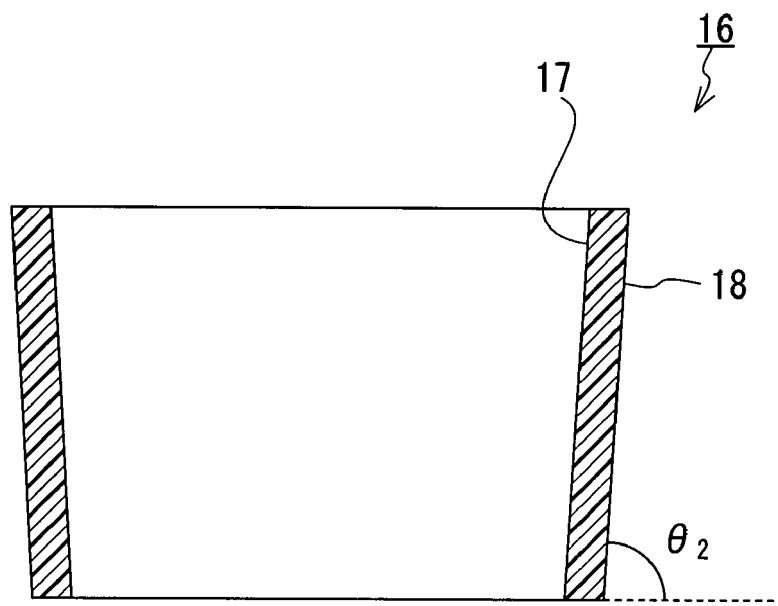
FIG. 8B is a cross-sectional view of the ferrule taken along line A-A in FIG. 8A.

The structure and configuration of the ferrule 16 is not particularly limited as long as it can join the connecting member 5 and the reduced-pressure chamber 3. As illustrated in FIGS. 8A and 8B, for example, the shape of the ferrule 16 may be in such a shape in which a truncated cone (truncated cone B) having the center that matches the center of a truncated cone (truncated cone A) and having a smaller diameter of the bottom face than that of the truncated cone A is removed from the truncated cone A. The side face of the truncated cone A corresponds to the fourth tapered portion 18, and the side face of the truncated cone B corresponds to the third tapered portion 17. FIG. 8B is a cross-sectional view of the ferrule 16 shown in FIG. 8A, taken along line A-A.

It is sufficient that the third tapered portion 17 be formed only in at least a portion of the inner peripheral surface of the ferrule 16. The shape of the third tapered portion 17 is not particularly limited as long as it can be brought into contact with the first tapered portion 14. It is sufficient that the fourth tapered portion 18 be formed only in at least a portion of the outer peripheral surface of the ferrule 16. The shape of the fourth tapered portion 18 is not particularly limited as long as it can be brought into contact with the second tapered portion 15.

Although the material that forms the ferrule 16 is not particularly limited, it is preferable that the ferrule 16 be made of a thermoplastic resin because, when the ferrule 16 is made of a thermoplastic resin, it can be heat-sealed to the connecting member 5 and/or the reduced-pressure chamber 3.

The type of the thermoplastic resin that constitutes the ferrule 16 is not particularly limited and may be the same type as the previously-mentioned resin that constitutes the connecting member 5 and the reduced-pressure chamber 3.

In the degassing apparatus 1 shown in FIG. 6, the connecting members 5 and the ferrules 16 are heat-sealed together. In the degassing apparatus 1 shown in FIG. 6, the reduced-pressure chamber 3 and the ferrules 16 are heat-sealed together at the through ports 2. In these cases, the joining between the connecting member 5 and the reduced-pressure chamber 3 can be retained more reliably. In cases where the connecting member 5, the chamber 3, and the ferrule 16 contain materials other than thermoplastic resin, respective thermoplastic resin portions thereof may be heat-sealed to each other.

Figure 9:
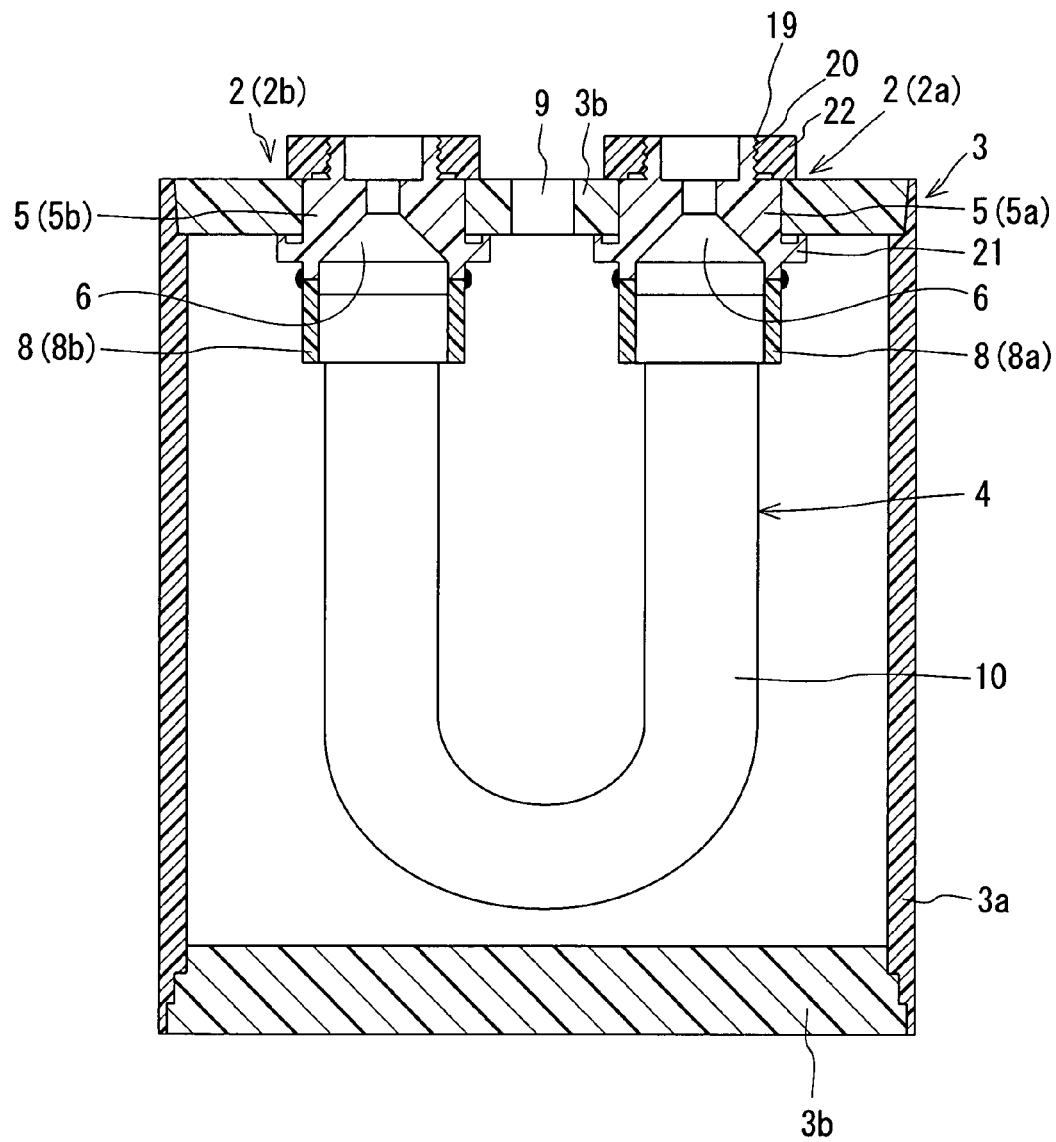
FIG. 9 is a cross-sectional view schematically illustrating yet another example of the degassing apparatus according to the present invention.

FIG. 9 illustrates yet another example of the first degassing apparatus according to the present invention. A degassing apparatus 1 shown in FIG. 9 has the same configuration as that of the degassing apparatus 1 shown in FIG. 1 except for the joining structure between the connecting member 5 and the reduced-pressure chamber 3.

Each of the connecting members 5 in the degassing apparatus 1 shown in the FIG. 9 has a configuration as illustrated in FIG. 4. The connecting member 5 and the reduced-pressure chamber 3 are joined in the following manner. The connecting member 5 is inserted from the interior of the chamber 3 through the through port 2 so that an abutting portion 21 of the connecting member 5 abuts onto the inner surface of the upper lid 3b. Thereafter, a fastening member 22 having a female thread portion 20 formed on the inner peripheral surface thereof is screw-fastened onto a male screw portion 19, which is formed on the outer peripheral surface of the connecting member 5 and protrudes outward from the chamber 3. With such a degassing apparatus as well, the connecting of the degassing element 4 and the connecting member 5 can be accomplished without using a fastening structure effected by a fastening means screwed together with a connecting member, unlike conventional degassing apparatuses, and thus a more reliable degassing apparatus can be provided.

The degassing apparatuses 1 shown in FIGS. 1 and 6 are provided with supply/discharge paths 12 for supplying the degassing target liquid to the degassing apparatuses 1 or discharging the degassing target liquid from the degassing apparatus 1. Each of the supply/discharge paths is in communication with the flow path 6 of the connecting member 5. The supply/discharge path 12 may be provided as needed.

The structure, configuration, and material of the supply/discharge path 12 are not particularly limited and may be selected as appropriate. For example, as illustrated in FIGS. 1 and 6, the supply/discharge path 12 may be made of a thermoplastic resin in a straight pipe-like shape.

Although the way in which the supply/discharge path 12 and the connecting member 5 are connected is not particularly limited, the connection effected by heat sealing as shown in FIGS. 1 and 6 is simple and easy, for example, when the supply/discharge path 12 and the connecting member 5 are made of a thermoplastic resin.

The manufacturing method of the degassing apparatus of the present invention is not particularly limited, and basically, known methods may be used. The heat sealing of the connecting member 5 and the joint piece 8 of the degassing element 4 may be carried out according to the methods set forth in the later-described examples.

When focusing on the joining structure between the connecting member 5 and the reduced-pressure chamber 3 of the degassing apparatus 1 shown in FIG. 1, the degassing apparatus according to the present invention also may be described as follows (a second degassing apparatus). The second degassing apparatus includes: a reduced-pressure chamber having a through port for flowing a degassing target liquid therethrough; a degassing element, accommodated in the chamber, for passing the liquid therethrough; and a connecting member, joined to the chamber at the through port, for fixing the degassing element to the chamber. The connecting member has a first tapered portion in at least a portion of its outer circumferential surface, when it is in a condition of being inserted in the through port. The first tapered portion decreases in diameter toward an interior of the chamber. The through port has a second tapered portion in at least a portion of its inner peripheral surface. The second tapered portion decreases in diameter toward the interior of the chamber. And, the connecting member is joined to the chamber with the first tapered portion being in contact with the second tapered portion.

When focusing on the joining structure between the connecting member 5 and the chamber 3 of the degassing apparatus 1 shown in FIG. 6, the degassing apparatus according to the present invention also may be described as follows (a third degassing apparatus). The third degassing apparatus includes: a reduced-pressure chamber having a through port for flowing a degassing target liquid therethrough; a degassing element, accommodated in the chamber, for passing the liquid therethrough; and a connecting member, joined to the chamber at the through port, for fixing the degassing element to the chamber. A ferrule is disposed between the connecting member and the through port. The connecting member has a first tapered portion in at least a portion of its outer peripheral surface, when it is in a condition of being inserted in the through port together with the ferrule. The first tapered portion decreases in diameter toward an interior of the chamber. The through port has a second tapered portion in at least a portion of its inner peripheral surface. The second tapered portion decreases in diameter toward the interior of the chamber. The ferrule has third and fourth tapered portions in at least respective portions of its inner peripheral surface and its outer peripheral surface, when the ferrule is in a condition of being inserted in the through port. The third and fourth tapered portions decrease in diameter toward the interior of the chamber. And, the connecting member is joined to the chamber via the ferrule with the first tapered portion being in contact with the third tapered portion and the second tapered portion being in contact with the fourth tapered portion.

These second and third degassing apparatuses can accomplish the joining of the reduced-pressure chamber and the connecting member without using a fastening structure effected by a fastening means screwed together with a connecting member, unlike conventional degassing apparatuses. With such a joining structure, the creep over time as described previously does not occur even when the connecting member is made of a resin. Therefore, the joining between the connecting member and the reduced-pressure chamber can be more reliably retained, and a more reliable degassing apparatus can be obtained.

EXAMPLES

Hereinbelow, the present invention will be described in detail with reference to examples. It should be understood, however, that the invention is not limited by the following examples.

Example 1

In Example 1, a degassing apparatus 1 shown in FIG. 1 was fabricated, and degassing of a degassing target liquid was conducted.

(Fabrication of Degassing Apparatus 1)

First, a cylindrical container 3a (wall thickness 5 mm, inner diameter 10 cm) as well as a disk-shaped upper lid 3b and a disk-shaped lower lid 3b (thickness 5 mm) were formed by cutting a cylindrical rod-shaped polypropylene. Each of the outer peripheral surfaces of the upper lid 3b and the lower lid 3b was provided with a tapered portion having an angle of 85° with respect to the major surface of the disk, and each of the inner peripheral surfaces of the openings of the container 3a was provided with a tapered portion in a shape such as to be in contact with the tapered portion of the lids 3b. Next, an inlet port 2a, an outlet port 2b, and a connection port 9 were formed in the upper lid 3b by forming three through holes, each having a circular cross-sectional shape. Each of the inner peripheral surfaces of the inlet port 2a and the outlet port 2b was formed into a second tapered portion 15 that had an angle of 85° with respect to the major surface of the upper lid 3b.

Separately from the fabrication of the container 3a, the upper lid 3b, and the lower lid 3b, connecting members 5 each having the shape shown in FIG. 3 were fabricated using PFA by cutting. The angle $\theta_1$ (see FIG. 3) of the first tapered portion 14 of each connecting member 5 was set at 85°.

Separately from the fabrication of these members, one hundred and twenty-five gas-permeable tubes, each of which was made of PTFE and having an inner diameter of 0.95 mm, a film thickness of 0.11 mm, and a length of 300 mm, were bundled together. The bundled gas-permeable tubes were heat-sealed to each other at their opposing ends with the use of PFA powder, whereby a tube bundle 10 was prepared. The heat sealing was carried out by applying PFA powder onto both end portions of the gas-permeable tubes that had been bundled together, and thereafter heating (and also pressurizing) the gas-permeable tubes at 370° C. for 10 minutes. Next, two heat-shrinkable cylindrical PFA pipes were prepared as the joint pieces 8, and the pipes were put onto the opposing end portions of the tube bundle 10 produced in the foregoing manner and thereafter heated, whereby a degassing element 4 was prepared in which the end portions of the tube bundle 10 were covered and supported with the joint pieces 8.

Figure 10:
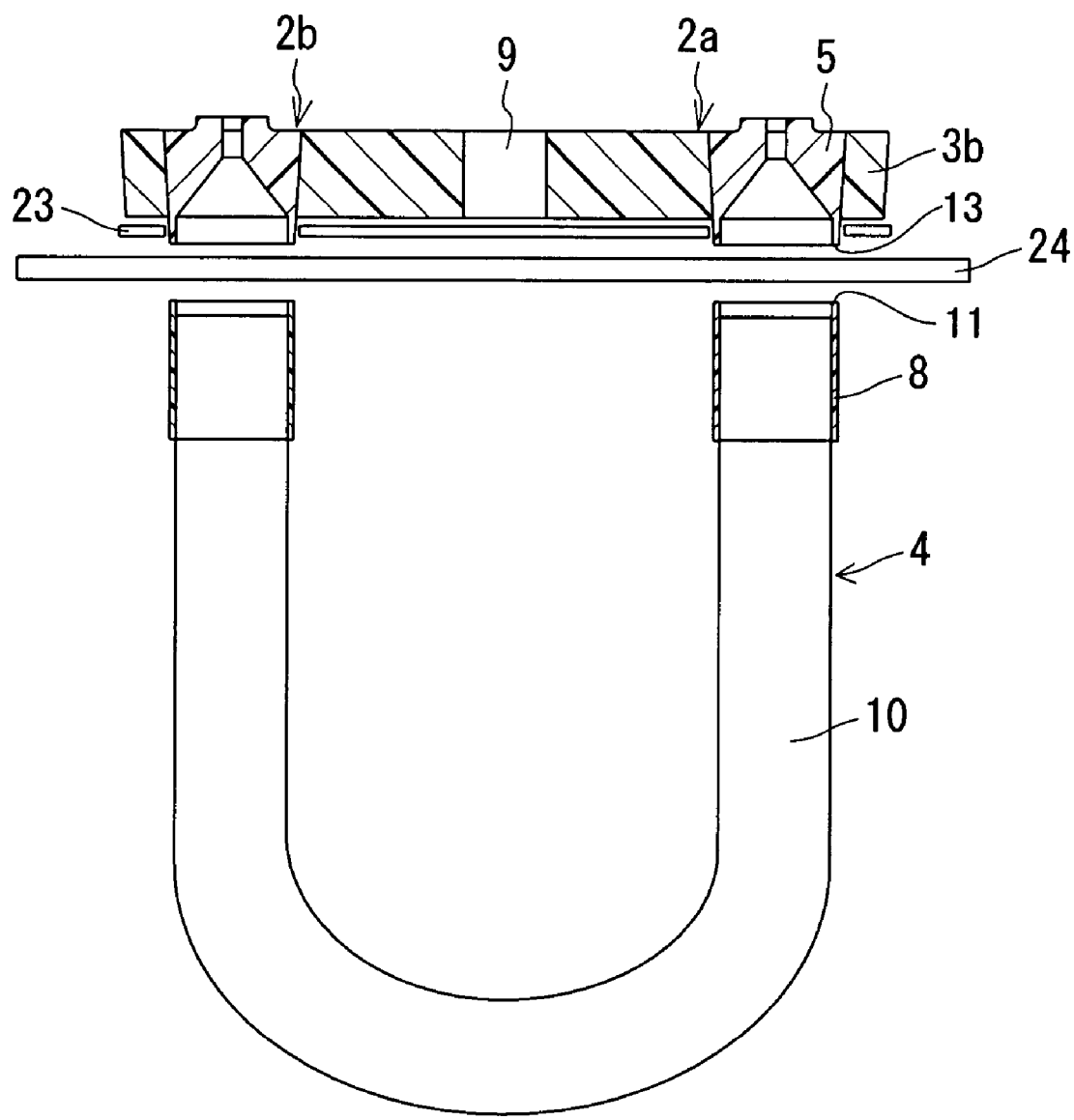
FIG. 10 is a schematic view illustrating one example of how a connecting member and a degassing element are connected.
Figure 11:
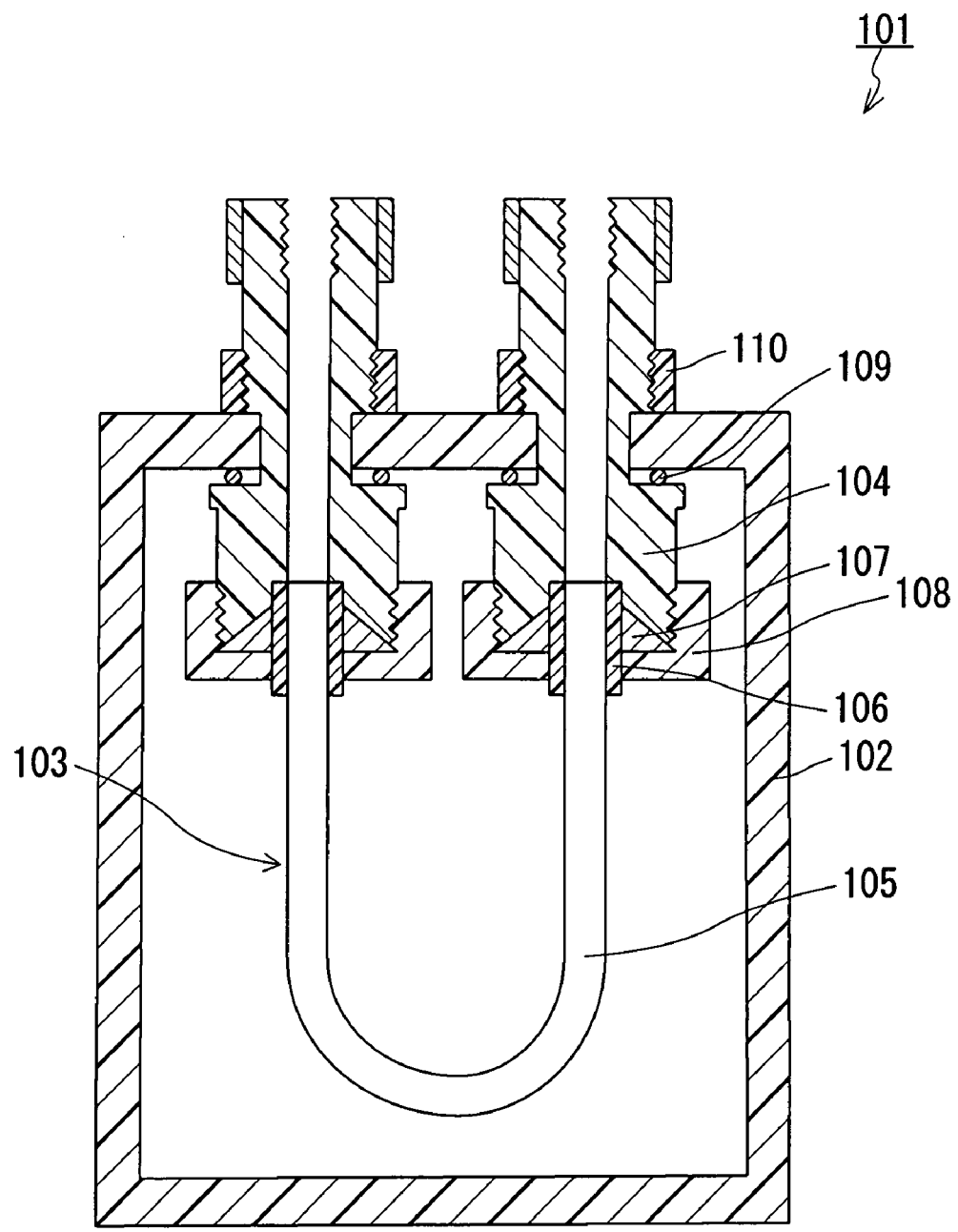
FIG. 11 is a cross-sectional view schematically illustrating one example of a conventional degassing apparatus.
Figure 12:
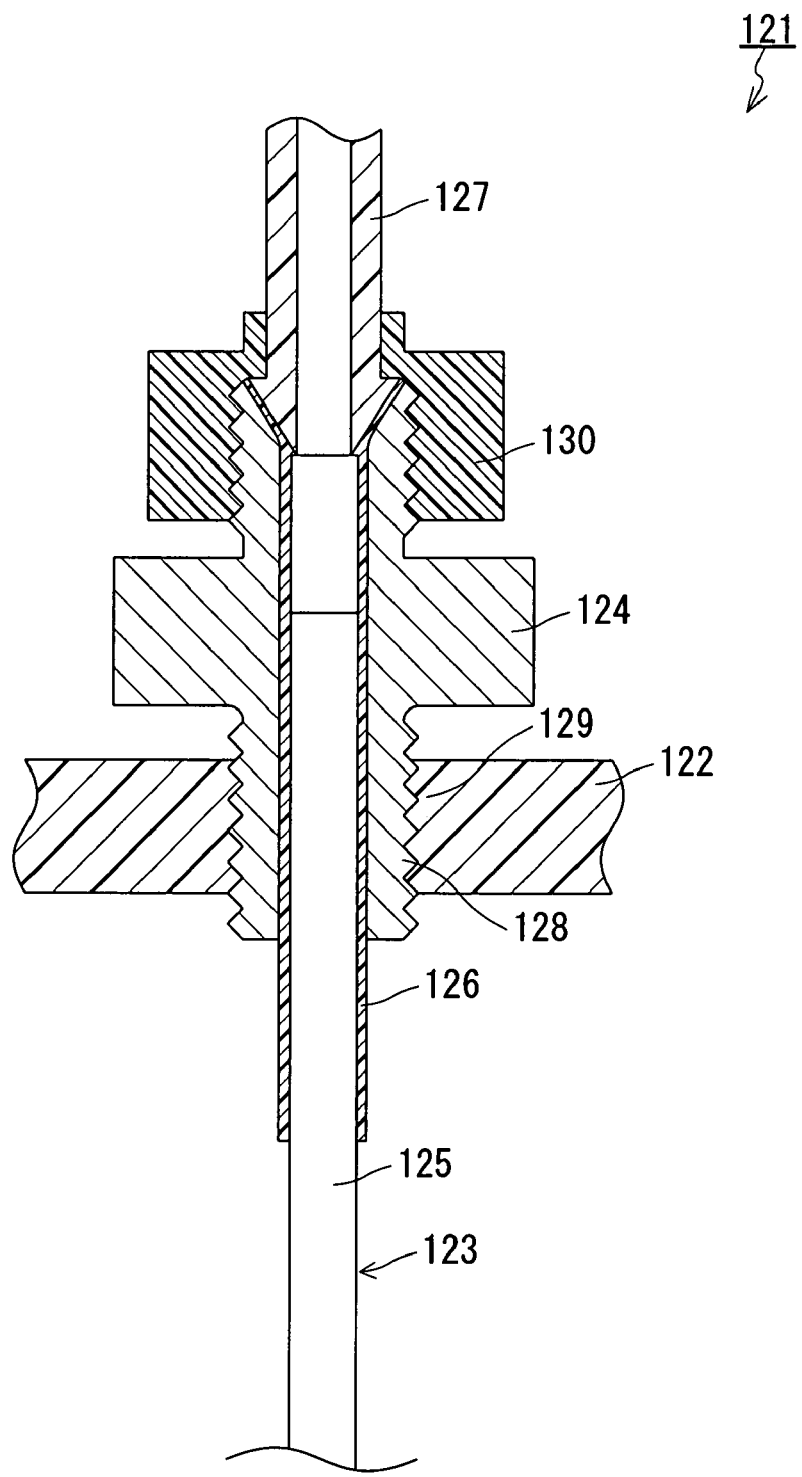
FIG. 12 is a cross-sectional view schematically illustrating one example of the connection structure for connecting a gas-permeable tube and a connecting member in the conventional degassing apparatus.

The degassing element 4 and the connecting members 5, which were prepared in the above-described manners, were connected to each other by heat sealing an end portion of the degassing element 4 and an end portion of each connecting member 5 together in the following manner: First, the connecting members 5 were inserted into the inlet port 2a and the outlet port 2b in the upper lid 3b so that the first tapered portion 14 of each connecting member 5 was brought into contact with the second tapered portion 15 of the inlet port 2a (or the outlet port 2b). Next, as shown in FIG. 10, the edge surface 11 of each joint piece 8 of the degassing element 4 and the edge surface 13 of each connecting member 5 were heated by a plate-type far-infrared heater 24 kept at 380° C. for 2 minutes, and after removing the infrared heater 24, the edge surface 11 and the edge surface 13 were abutted against each other. Next, all the components were cooled to room temperature while the edge surfaces of both parts were kept abutted against each other, whereby the degassing element 4 and the connecting member 5 were connected by heat sealing the each edge surface 11 and the edge surface 13 of both respective parts together. It should be noted that a cooling plate 23 was also used in heating the edge surface 11 and the edge surface 13 by the far-infrared heater 24 to prevent heat from transferring to the regions other than both edge surfaces.

Next, the lower lid 3b was fitted into one of the openings of the container 3a while the tapered portion of the container 3a and the tapered portion of the lower lid 3b were brought into contact with each other. Next, the upper lid 3b, in which the connecting members 5 connected to the degassing element 4 are inserted in the inlet port 2a and the outlet port 2b, was fitted into the other one of the openings of the container 3a so that the degassing element 4 could be accommodated in the container 3a while the tapered portion of the container 3a and the tapered portion of the upper lid 3b were brought into contact with each other.

Next, a pressure-reducing apparatus was connected to the connection port 9 formed in the upper lid 3b. While the interior of the container 3a was being depressurized, the container 3a and the lower lid 3b, the container 3a and the upper lid 3b, and the upper lid 3b and the connecting members 5, respectively, were joined together by heat sealing.

Finally, tubular supply/discharge paths 12 made of PFA were joined to the connecting members 5 respectively by heat sealing so as to be in communication with the flow paths 6 of the connecting members 5, whereby the degassing apparatus 1 was fabricated.

(Degassing Experiment)

The interior of the reduced-pressure chamber 3 of the degassing apparatus 1 fabricated in the above-described manner was depressurized to a pressure of 4 kPa by the pressure-reducing apparatus connected to the connection port 9. Under this condition, water was supplied from a supply/discharge path 12 through the inlet port 2a for 10 seconds at a water pressure of 0.3 MPa, and then the supply of water was halted for 60 seconds. This cycle was repeated 100,000 times. The result was that no water leakage was observed in the reduced-pressure chamber 3, and the connection between the degassing element 4 and the connecting members 5 was in a good condition. Furthermore, when the pressure-reducing apparatus was stopped after the foregoing 100,000 test cycles, almost no change was observed in the degree of the pressure reduction inside the reduced-pressure chamber 3, and thus, the joining between the connecting members 5 and the reduced-pressure chamber 3 was in a good condition.

Example 2

In Example 2, a degassing apparatus 1 shown in FIG. 6 was fabricated, and degassing of a degassing target liquid was conducted.

(Fabrication of Degassing Apparatus 1)

A container 3a, an upper lid 3b, a lower lid 3b, a degassing element 4, and connecting members 5 were fabricated in the same manner as described in Example 1.

Separately from the fabrication of the above-described components, ferrules 16 as illustrated in FIGS. 8A and 8B were prepared. Each of the prepared ferrules 16 was made of polypropylene, and the angle $\theta_2$ (see FIG. 8B) of the third tapered portion 17 and the fourth tapered portion 18 was set at 85°.

Next, the degassing element 4 and the connecting members 5 were connected to each other by heat sealing an end portion of the degassing element 4 and an end portion of each connecting member 5 together in the following manner: First, the ferrules 16 were respectively inserted into the inlet port 2a and the outlet port 2b in the upper lid 3b. Then, the connecting members 5 were also inserted into the ferrules 16 so that the first tapered portion 14 of each connecting member 5 was brought into contact with the third tapered portion 17 of each ferrule 16 while the fourth tapered portion 18 of each ferrule 16 was brought into contact with the second tapered portion 15 of the inlet port 2a (or of the outlet port 2b).

Next, the degassing element 4 and the connecting members 5 were connected in the same manner as described in Example 1.

Next, the lower lid 3b was fitted into one of the openings of the container 3a while the tapered portion of the container 3a and the tapered portion of the lower lid 3b were brought into contact with each other. Next, the upper lid 3b, in which the connecting members 5 and the ferrules 16 are inserted in the inlet port 2a and the outlet port 2b, was fitted into the other one of the openings of the container 3a so that the degassing element 4 could be accommodated in the container 3a while the tapered portion of the container 3a and the tapered portion of the upper lid 3b were brought into contact with each other.

Next, a pressure-reducing apparatus was connected to the connection port 9 formed in the upper lid 3b. While the interior of the container 3a was being depressurized, the container 3a and the lower lid 3b, the container 3a and the upper lid 3b, the upper lid 3b and the ferrules 16, and the ferrules 16 and the connecting members 5, respectively, were joined together by heat sealing.

Finally, tubular supply/discharge paths 12 made of PFA were joined to the connecting members 5 respectively by heat sealing so as to be in communication with the flow paths 6 of the connecting members 5, whereby the degassing apparatus 1 was fabricated.

(Degassing Experiment)

The interior of the reduced-pressure chamber 3 of the degassing apparatus 1 fabricated in the above-described manner was depressurized to a pressure of 4 kPa by the pressure-reducing apparatus connected to the connection port 9. Under this condition, water was supplied from a supply/discharge path 12 through the inlet port 2a for 10 seconds at a water pressure of 0.3 MPa, and then the supply of water was halted for 60 seconds. This cycle was repeated 100,000 times. The result was that no water leakage was observed in the reduced-pressure chamber 3, and the connection between the degassing element 4 and the connecting members 5 was in a good condition. Furthermore, when the pressure-reducing apparatus was stopped after the foregoing 100,000 test cycles, almost no change was observed in the degree of the pressure reduction inside the reduced-pressure chamber 3, and thus, the joining between the connecting members 5 and the ferrules 16 as well as the joining between the ferrules 16 and the reduced-pressure chamber 3 was in a good condition.

The present invention makes it possible to provide a degassing apparatus that accomplishes the connecting of the degassing element and a connecting member and/or the joining of the vacuum (reduced-pressure) chamber and the connecting member without using a fastening structure effected by a fastening means screwed together with a connecting member, unlike conventional degassing apparatuses.

The invention may be embodied in other forms without departing from the purposes and essential characteristics thereof. The embodiments disclosed in this specification are to be considered in all respects as illustrative and not limiting. The scope of the present invention is indicated by the appended claims rather than by the foregoing description, and all changes which come within the meaning and range of equivalency of the claims are intended to be embraced therein.

What is claimed is:

1. A degassing apparatus comprising:
   a reduced-pressure chamber having a through port for flowing a degassing target liquid therethrough;
   a degassing element, accommodated in the chamber, for passing the liquid therethrough; and
   a tubular connecting member joined to the chamber at the through port, wherein the degassing element comprises a gas-permeable tube, for passing the liquid therethrough, being covered with a tubular joint piece at an end portion of the gas-permeable tube;
   the degassing element being fixed to the chamber by heat sealing the connecting member and the joint piece;
   the connecting member, when being inserted in the through port, having in at least a portion of its outer peripheral surface, a first tapered portion that decreases in diameter toward an interior of the chamber;
   the through port having, in at least a portion of its inner peripheral surface, a second tapered portion that decreases in diameter toward an interior of the chamber;
   the connecting member being joined to the chamber with the first tapered portion and the second tapered portion being in contact with each other to provide a sealing structure.

2. The degassing apparatus according to claim 1, comprising:
   a plurality of the connecting members, wherein the chamber has an inlet port to which the liquid flows in and an outlet port from which the liquid flows out, each of the inlet port and the outlet port serving as the through port;
   a first one of the connecting members is joined to the chamber at the inlet port;
   a second one of the connecting members is joined to the chamber at the outlet port;
   one end portion of the degassing element is connected to the first connecting member; and
   the other end portion of the degassing element is connected to the second connecting member.

3. The degassing apparatus according to claim 1, wherein an end portion of the connecting member and an end portion of the joint piece are heat-sealed together.

4. The degassing apparatus according to claim 1, wherein the joint piece has a cylindrical tubular shape.

5. The degassing apparatus according to claim 1, wherein the joint piece and the connecting member are made of a thermoplastic resin.

6. The degassing apparatus according to claim 5, wherein the connecting member and the joint piece are made of the same thermoplastic resin.

7. The degassing apparatus according to claim 5, wherein at least one of the connecting member and the joint piece is made of a fluoropolymer.

8. The degassing apparatus according to claim 7, wherein the fluoropolymer is tetrafluoroethylene perfluoroalkyl vinyl ether copolymer (PFA).

9. The degassing apparatus according to claim 1, wherein the gas-permeable tube is made of polytetrafluoroethylene (PTFE).

10. The degassing apparatus according to claim 1, wherein the degassing element comprises a plurality of the gas-permeable tubes;
    the gas-permeable tubes are bound to each other at their respective end portions to form a tube bundle; and
    the joint piece covers an end portion of the tube bundle.

11. The degassing apparatus according to claim 1, wherein the connecting member and the chamber are heat-sealed together.

12. A degassing apparatus comprising:
    a reduced-pressure chamber having a through port for flowing a degassing target liquid therethrough;
    a degassing element accommodated in the chamber for passing the liquid therethrough; and
    a tubular connecting member joined to the chamber at the through port, wherein the degassing element comprises a gas-permeable tube, for passing the liquid therethrough, being covered with a tubular joint piece at an end portion of the gas-permeable tube;
    the degassing element being fixed to the chamber by heat sealing the connecting member and the joint piece;
    wherein the connecting member is joined to the chamber via a ferrule disposed between the connection member and the through port;
    the connecting member, when inserted in the through port together with the ferrule has, in at least a portion of its outer peripheral surface, a first tapered portion that decreases in diameter toward an interior of the chamber;
    the through port has, in at least a portion of its inner peripheral surface, a second tapered portion that decreases in diameter toward an interior of the chamber;
    the ferrule that is in a condition of being inserted in the through port has, in at least respective portions of its inner peripheral surface and its outer peripheral surface, third and fourth tapered portions that decrease in diameter toward an interior of the chamber; and
    the connecting member is joined to the chamber via the ferrule with the first tapered portion being in contact with the third tapered portion and the second tapered portion being in contact with the fourth tapered portion to provide a sealing structure.

13. The degassing apparatus according to claim 12, wherein the ferrule is made of a thermoplastic resin.

14. The degassing apparatus according to claim 12, wherein the connecting member and the ferrule are heat-sealed together.

15. The degassing apparatus according to claim 12, wherein the chamber and the ferrule are heat-sealed.

16. The degassing apparatus according to claim 1, wherein the chamber has a container constructed of a tubular body and a lid sheet for sealing an opening at an end portion of the tubular body; and the through port is formed in the lid sheet.

17. The degassing apparatus according to claim 16, wherein the lid sheet is made of a thermoplastic resin.

18. A degassing apparatus comprising:

a reduced-pressure chamber for flowing a degassing target liquid therethrough;

a degassing element, accommodated in the chamber, for passing the liquid therethrough;

a connecting member joined to the chamber at the through port, for fixing the degassing element to the chamber, wherein the connecting member that is in a condition of being inserted in the through port has, in at least a portion of its outer peripheral surface, a first tapered portion that decreases in diameter toward an interior of the chamber;

the through port has, in at least a portion of its inner peripheral surface, a second tapered portion that decreases in diameter toward an interior of the chamber; and the connecting member is joined to the chamber with the first tapered portion and the second tapered portion being in contact with each other to provide a sealing structure.

19. A degassing apparatus comprising:

a reduced-pressure chamber having a through port for flowing a degassing target liquid therethrough;

a degassing element, accommodated in the chamber, for passing the liquid passes therethrough;

a connecting member joined to the chamber at the through port, for fixing the degassing element to the chamber, wherein a ferrule is disposed between the connecting member and the through port;

the connecting member that is in a condition of being inserted in the through port together with the ferrule has, in at least a portion of its outer peripheral surface, a first tapered portion that decreases in diameter toward an interior of the chamber, the through port has, in at least a portion of its inner peripheral surface, a second tapered portion that decreases in diameter toward an interior of the chamber;

the ferrule that is in a condition of being inserted in the through port has in at least respective portions of its inner peripheral surface and its outer peripheral surface, third and fourth tapered portions that decrease in diameter toward an interior of the chamber; and the connecting member is joined to the chamber via the ferrule with the first tapered portion being in contact with the third tapered portion and the second tapered portion being in contact with the fourth tapered portion to provide a sealing structure.

20. The degassing apparatus according to claim 1, wherein the through port has the second tapered portion in the whole inner surface of the through port.

21. The degassing apparatus according to claim 20, wherein the connecting member has the first tapered portion in the whole outer peripheral surface of the connecting member.

22. The degassing apparatus according to claim 12, wherein the through port has the second tapered portion in the whole inner peripheral surface of the through port.

23. The degassing apparatus according to claim 22, wherein the connecting member has the first tapered portion in the whole outer peripheral surface of the connecting member;

and the ferrule has the third and the fourth tapered portions in the whole inner and outer peripheral surfaces of the ferrule, respectively.

24. The degassing apparatus according to claim 12, wherein the outer peripheral surface of the connecting member is apart from the inner peripheral surface of the through port.

25. The degassing apparatus according to claim 12, wherein the chamber has a container constructed of a tubular body and a lid sheet for sealing an opening at an end portion of the tubular body; and the through port is formed in the lid sheet.

* * * * *